Feb. 23, 1971    R. E. MEYER    3,564,641
PORTABLE VACUUM UNIT
Filed Oct. 14, 1968    3 Sheets-Sheet 1
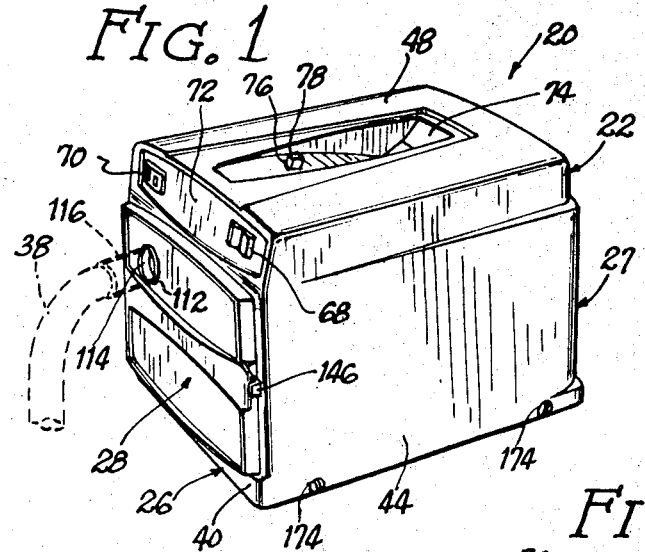
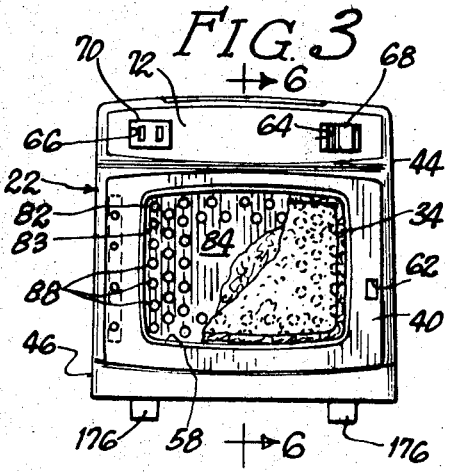
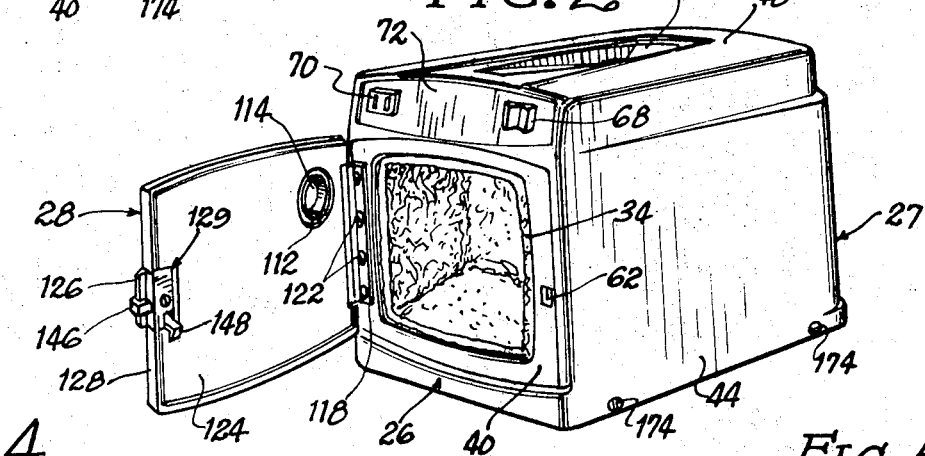
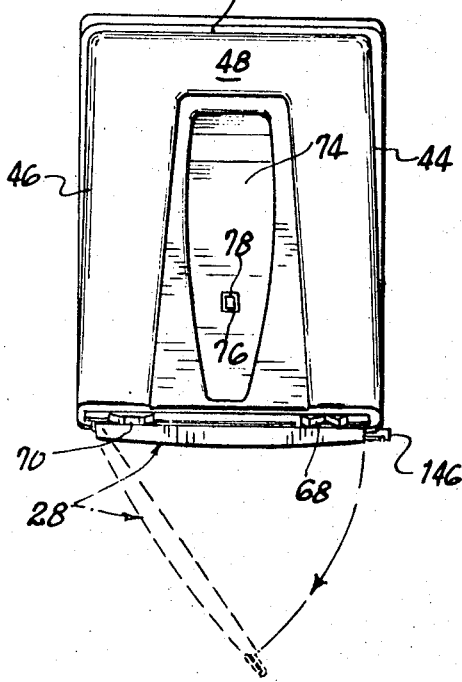
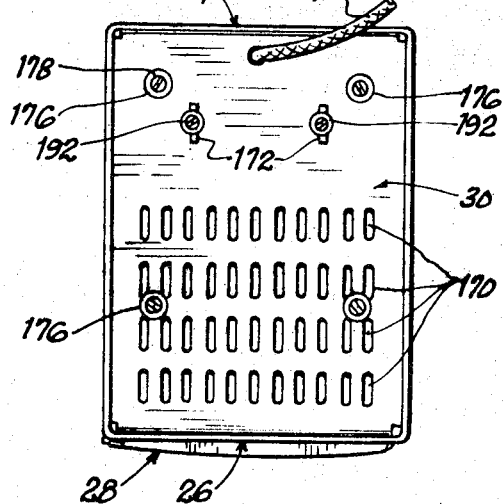
INVENTOR
Roy E. Meyer
by Zabel, Baker, York, Jones
and Dithmar  Att'ys Feb. 23, 1971   R. E. MEYER   3,564,641
PORTABLE VACUUM UNIT
Filed Oct. 14, 1968   3 Sheets-Sheet 3
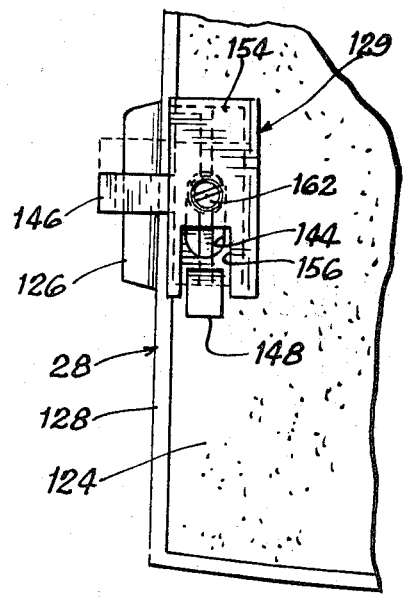
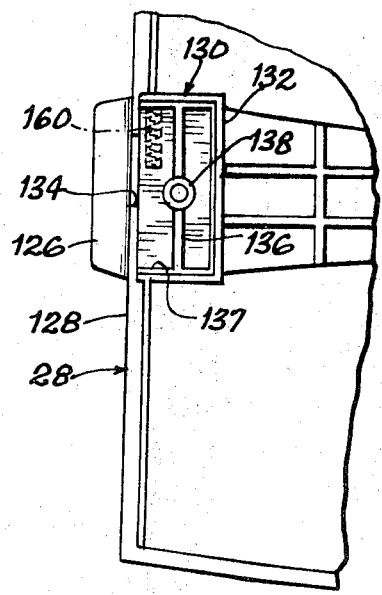
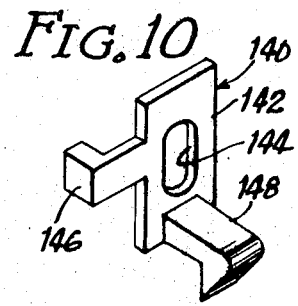
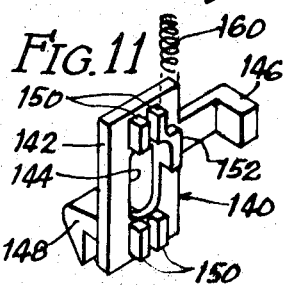
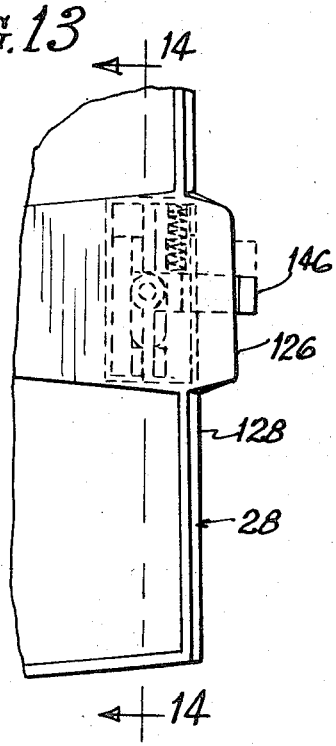
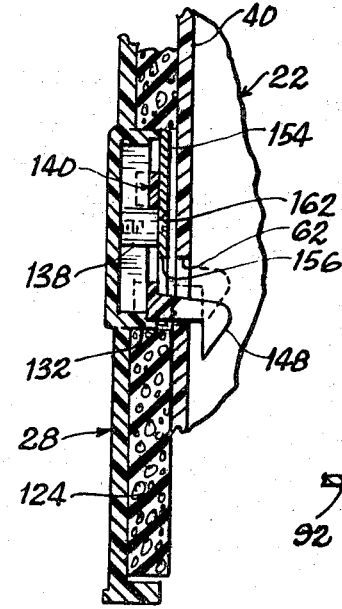
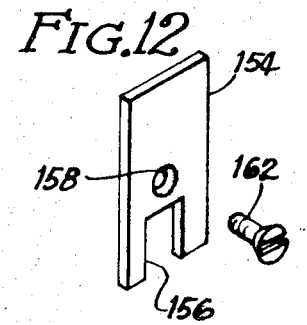
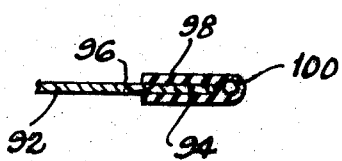
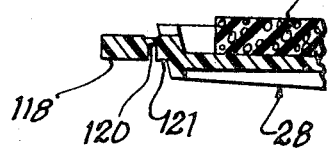
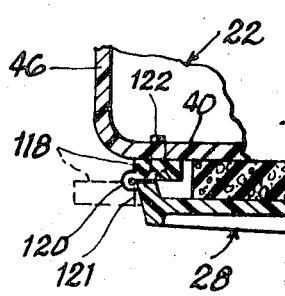

United States Patent Office 3,564,641
Patented Feb. 23, 1971

3,564,641
PORTABLE VACUUM UNIT
Roy E. Meyer, Sterling, Ill., assignor to Wahl Clipper Corporation, Sterling, Ill., a corporation of Illinois
Filed Oct. 14, 1968, Ser. No. 767,455
Int. Cl. A47l 5/36
U.S. Cl. 15—323　　　　　　　　　　　　　　6 Claims

ABSTRACT OF THE DISCLOSURE

A portable vacuum unit adapted for countertop use includes a housing, a vacuum chamber within the housing at one end thereof for receiving a refuse bag in the chamber, a door on the housing providing access to the chamber, a vacuum hose-receiving opening extending through the door for communication with the interior of the chamber, a perforated base plate on the housing forming an enclosure therewith, and a motor and fan assembly mounted on the base plate within the housing for communication with the interior of the chamber.

BACKGROUND OF THE INVENTION

This invention relates to portable vacuum units, more particularly, to a unit adapted for countertop use in conjunction with a hair clipper or the like for collecting hair clippings.

The removal and disposal of hair clippings has long been a problem for the barber. The clippings commonly are allowed to fall on the customer and on the floor, and are periodically swept from the floor. Not only does the problem exist in barbershops, but it also exists in making house and hospital calls, where the necessity for cleanup may be greater while the facilities are poorer.

It would be most advantageous to provide for complete removal of hair clippings in a manner which is convenient and efficient in a barbershop or in any other area where it is necessary to cut hair. In particular, a vacuum unit which would immediately collect hair clippings in any location would eliminate the discomfort of clipped hair, provide healthier working conditions, and maintain clean and sanitary conditions in barbershops, homes, hospitals institutions, and other places where hair is cut.

SUMMARY OF THE INVENTION

The present invention provides a portable vacuum unit adapted for countertop use which is especially useful for removing hair clippings at any desired location. The unit includes a housing, a vacuum chamber mounted within the housing at one end thereof for receiving a refuse bag in the chamber, a door mounted on the housing end providing access to the chamber, means forming a vacuum hose-receiving opening extending through the door for communication with the interior of the chamber, a perforated base plate detachably mounted on the housing and forming an enclosure therewith, and a motor and fan assembly mounted on the base plate within the housing for communication with the interior of the chamber. The unit is adapted for use with a vacuum hose to which a hair clipper is attached.

The unit includes various other novel features, as described hereinafter, which further combine to provide a portable, lightweight, efficient assembly that sets conveniently on a back bar or table in a barbershop, or on whatever support may be available in other locations. The unit both is small and compact and has substantial capacity. At the same time, it has a long, trouble-free service life.

The new unit is constructed for convenience in use and quiet operation. Hair clippings are removed by strong vacuum or suction force which, moreover, assists the operation of the hair clipper. Clean air is discharged from the unit at low velocity, further contributing to quiet and sanitary operation. Also, the unit is constructed to minimize vibration.

BRIEF DESCRIPTION OF THE DRAWINGS

The attached drawings illustrate a preferred embodiment of the invention, without limitation thereto. In the drawings, like elements are identified by like reference symbols in each of the views, and:

FIG. 1 is a perspective view of a vacuum unit according to the invention;

FIG. 2 is another perspective view of the unit, with a door thereof opened to reveal the interior of a vacuum chamber as it appears with a refuse bag in place therein;

FIG. 3 is a front elevational view of the unit, with the door removed;

FIG. 4 is a top plan view of the unit, illustrating closed and opened positions of the door in full and phantom lines respectively;

FIG. 5 is a bottom plan view of the unit;

FIG. 8 is a further enlarged fragmentary sectional view of the interior of the door, illustrating a latch assembly mounted thereon;

FIG. 9 is a view similar to FIG. 8, but with parts of the latch assembly and a liner removed from the door;

FIGS. 10 and 11 are enlarged perspective views of a latch member in the latch assembly, viewed from opposite sides thereof;

FIG. 12 is a perspective view of a cover plate in the latch assembly;

FIG. 13 is an enlarged fragmentary elevational view of the exterior of the door at the latch assembly;

FIG. 14 is an enlarged fragmentary vertical sectional view of the door, latch assembly and adjacent housing, taken substantially on line 14—14 of FIG. 13;

FIG. 15 is an enlarged fragmentary sectional view of the door and an integral hinge;

FIG. 16 is a view similar to FIG. 15, illustrating the manner in which the door is hingedly mounted on the housing; and FIG. 17 is an enlarged fragmentary sectional view of the rim of a component of the vacuum chamber and a sealing strip thereon.

DESCRIPTION OF THE PREFERRED EMBODIMENT

Figure 6:
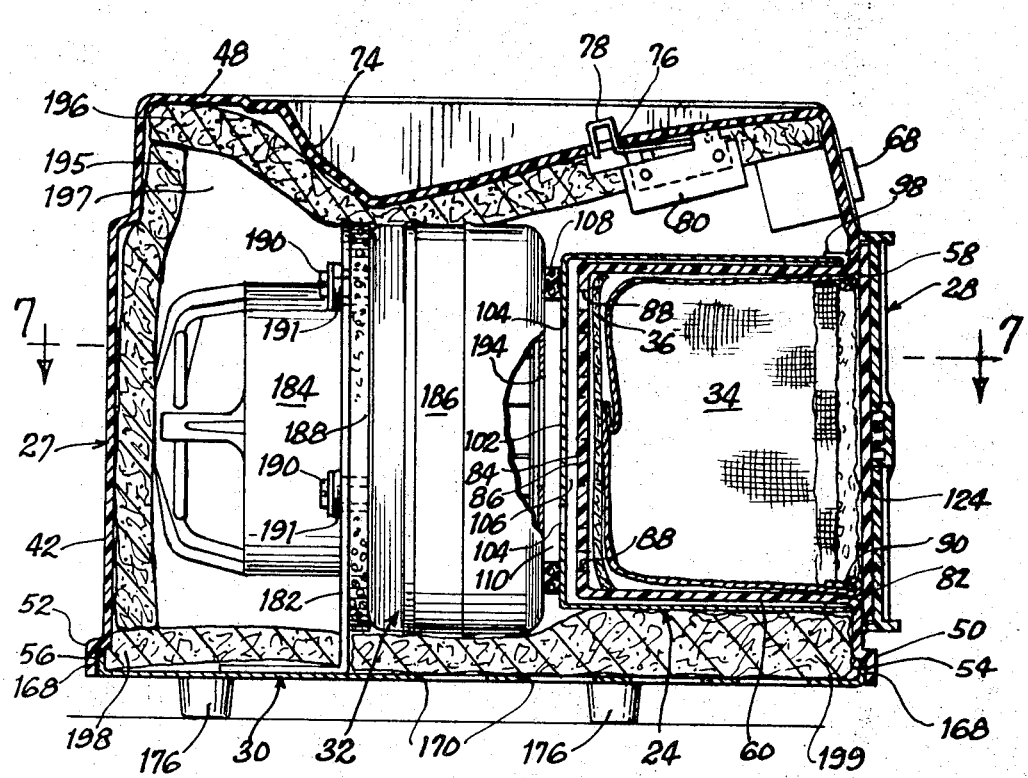
FIG. 6 is an enlarged vertical longitudinal sectional view of the unit with parts broken away, taken substantially on line 6—6 of FIG. 3.

Referring to the drawings, particularly FIGS. 1–7, a portable vacuum unit 20 constructed according to a preferred embodiment of the invention includes a housing or casing 22, a vacuum chamber 24 mounted within the housing at its front end 26 and spaced from its rear end 27, a door 28 mounted on the front end of the housing, a perforated base plate 30 mounted on the housing and forming an enclosure therewith, and a motor and fan assembly 32 mounted on the base plate within the housing between the vacuum chamber and the rear end of the housing.

A cloth refuse bag 34 and a felted filter pad 36 are removably received within the vacuum chamber 24, access thereto being provided by the door 28. The door is constructed for attaching one end of a vacuum hose 38 thereto for communication with the interior of the vacuum chamber. The opposite end of the hose is connected to a hair clipper. Also, the hose may carry an electric cord, not illustrated, for operation of the clipper.

The housing 22 is of generally rectangular construction and includes opposite front and rear end walls 40 and 42, opposite side walls 44 and 46, and a top wall 48. The end walls are provided with offset bottom marginal portions 50 and 52 forming shoulders 54 and 56, respectively, with the adjacent portions of the walls.

A generally rectangular compartment opening 58 is formed in the front end wall 40, and the rim of an open rectangular bag compartment or receptacle 60 is formed integrally with the end wall around the opening. The bag compartment extends inwardly from the front end wall into the housing. A latch opening 62 is formed in the front end wall between the compartment opening 58 and one side wall 44. Switch and receptacle openings 64 and 66 (FIG. 3) are provided in the upper portion of the front end wall, and a three-position main switch 68 and a receptacle 70 for a two-pronged electrical plug are mounted in the respective openings. A nameplate 72 is mounted on the upper portion of the front end wall, and the switch and receptacle extend therethrough.

An instrument well or tray 74 is formed integrally in the housing top wall 48, and it conforms to the shape of a hair clipper. A switch arm opening 76 is formed in the instrument well, at an elevation above the bottom of the well. The opening receives a spring-pressed actuating arm or lever 78 of an on-off switch 80 mounted on the well within the housing. The housing 22, the bag compartment 60, and the instrument well 74 together constitute a one-piece molded member formed of preferably lightweight and durable plastic such as linear polyethylene.

Figure 7:
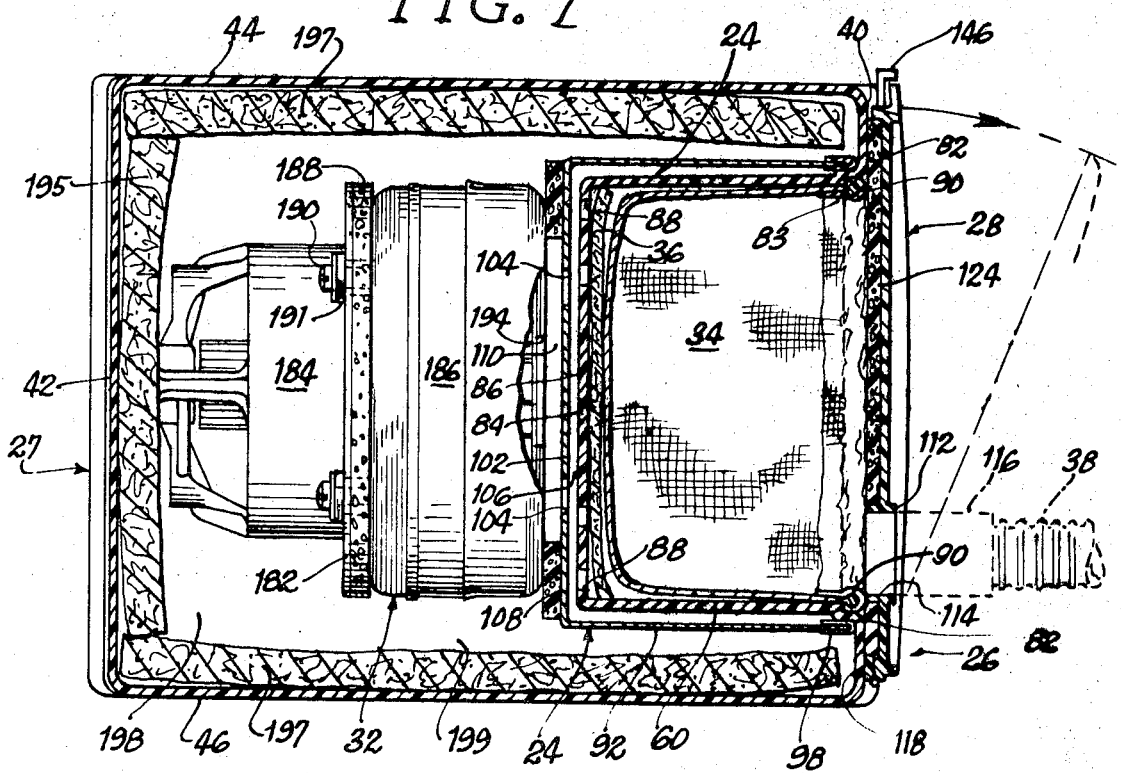
FIG. 7 is an enlarged horizontal sectional view of the unit, with parts broken away, taken substantially on line 7—7 of FIG. 6.

Referring particularly to FIGS. 6 and 7, the bag compartment 60 includes a peripheral outwardly offset flange 82 which is integral with the housing front end wall 40 around its opening 58. The flange forms a shoulder 83 with the adjacent portions of the compartment. The rear wall 84 of the bag compartment is formed with a central imperforate portion 86 and a plurality of exhaust perforations or openings 88 therearound adjacent the side walls of the compartment (see also FIG. 3).

In use, the filter pad 36 is placed in the bag compartment against its rear wall 84, and the refuse bag 34 is inserted in the compartment thereover, with the mouth of the bag supported on a wire ring 90 attached to the bag and seated on the shoulder 83 adjacent the compartment opening 58. The bag collects hair drawn into the vacuum chamber, and the filter pad serves to collect fine material and support the bottom of the bag slightly away from the exhaust perforations 88.

A generally rectangular open-ended perforated vacuum compartment 92 encloses the bag compartment 60, and together they form a double-walled vacuum chamber 24. As seen in FIG. 17, the rim or mouth 94 of the vacuum compartment is received in an elongated recess 96 in a sealing strip 98. The strip is formed of elastomeric material and provided with a hollow outer edge 100. The rim of the vacuum compartment is mounted on the bag compartment flange 82 therearound and abuts the front end wall 40, and the sealing strip 98 forms a tight seal, conforming to any surface irregularities. The vacuum compartment is spaced from the top wall 48 and the side walls 44 and 46 of the housing, and from the base plate 30.

The rear wall 102 of the vacuum compartment 92 is provided with exhaust perforations or openings 104 arranged in a rectangular pattern therearound. The perforations are somewhat larger than the exhaust perforations 88 in the bag compartment, and are also spaced inwardly from the sides of the vacuum compartment to a greater extent than the outer perforations in the bag compartment. The vacuum compartment is spaced from the bag compartment, and particularly from the perforations 88 thereof, to provide an air space 106 therebetween for air flow and distribution purposes. The vacuum compartment preferably is constructed of relatively strong and rigid material, such as sheet metal.

A rectangular annular gasket 108 is secured to the outer surface of the rear wall 102 of the vacuum compartment, and the gasket encloses the perforations 104 in the wall. The gasket is of appreciable thickness, and forms an air space 110 with the rear wall for a purpose subsequently described. The gasket is constructed of resilient material, such as cellulose sponge.

Referring again to FIGS. 1–7, the door 28 is formed integrally with a hose mounting ring 112 defining a hose-receiving opening 114 extending through the door for communication with the interior of the vacuum chamber 24. The mounting ring serves to receive in close-fitting engagement therein a coupling sleeve or tube 116 on the end of the vacuum hose 38.

Referring also to FIGS. 15 and 16 a door hinge includes a hinge bar 118 and a flexible web 120 integrally jointed thereto and to one edge 121 of the door 28. The door, mounting ring, and hinge preferably constitute a one-piece molded assembly, as illustrated, constructed of a plastic such as polypropylene. The door is mounted on the front end wall 40 of the housing by means of screws 122 extending through the hinge bar into the wall (see FIG. 2). The door swings on the hinge structure from a closed position, illustrated in FIG. 1, to an open position, illustrated in FIG. 2, for access to the bag compartment 60 through the compartment opening 58.

The inner surface of the door 28 is lined with a liner sheet 124 of resilient sound-adsorbing material, such as cellulose sponge. The liner extends laterally beyond the compartment opening 58 therearound to function both as a sound deadener and as a sealing gasket between the door and the housing front end wall 40.

Referring to the FIGS. 8–14, the door 28 includes an outwardly extending tab 126 integral with the edge 128 of the door opposite to the hinged edge 121. A latch assembly 129 is mounted on the door adjacent to the tab, and it includes a rectangular latch holder 130 formed integrally with the door. The tab and holder are adjacent to the latch opening 62 in the housing front end wall 40 when the door is closed.

The latch holder 130 includes a rectangular outer wall 132 having a lever-receiving slot 134 adjacent to the tab 126. A slide bar member 136 is formed in the center of the latch holder and extends parallel to the door edge 128. The slide bar and the holder wall 132 define a spring cavity 137 adjacent the lever-receiving slot. A screw-receiving boss 138 is formed integrally with the slide bar 136 at its center.

A unitary latch member 140 includes a rectangular flat body 142 having a central elongated opening 144. An L-shaped operating lever 146 extends from one edge of the body. A hook-shaped latch 148 extends from one face of the body. Two pairs of guides 150 extend in parallel from the opposite face of the body. A spring stop 152 extends from the latter face adjacent to one pair of guides. A rectangular cover plate 154 is provided with a rectangular slot 156 at one end thereof, and with a central screw opening 158. The latch member 140 preferably is constructed of plastic material such as nylon, and the cover plate 154 preferably is constructed of metal.

The latch holder 130, the latch member 140, the cover plate 154, a coil spring 160 and a screw 162 are assembled to form the latch assembly 129. The assembly cooperates with the latch opening 62 in the housing front end wall 140 and with the door liner 124 to latch and seal the door 28 against the housing. In the latch assembly, the latch member is mounted in the latch holder with the guides 150 on opposite sides of the slide bar 136, and the boss 138 extending through the latch member opening 144. The spring 160 is inserted in the spring cavity 137, and the spring bears against the wall 132 and the stop 152 on the latch member. The cover plate 154 is placed over the latch member and secured to the boss 138 by the screw 162.

The latch 148 is arranged to snap through the latch opening 62, and the spring serves to hold the latch down over an adjacent portion of the front end wall 40, which serves as a latch retainer or keeper, as illustrated in FIG. 14. The door is unlatched by moving the operating lever 146 upwardly against the force of the spring 160, to permit the latch to be withdrawn from the latch opening.

The latch and retainer structure permit relative movement between the door 28 and the housing 22. The liner 124 serving as a resilient gasket extends inwardly towards the housing beyond the cover plate 154. Consequently, the door may be drawn into tight sealing relation to the housing and to the vacuum chamber 24 therein by the application of reduced pressure or vacuum to the chamber.

Referring to FIGS 5–7, the base plate 30 is a rectangular member having upturned flanges 168 along its sides. Four rows of elongated spaced apart discharged openings 170 are provided in the base plate, and they extend from adjacent to the front end 26 of the housing for slightly greater than one-half of the distance to the rear end 27. The remainder of the base plate, adjacent to the rear end of the housing, is substantially imperforate, except for a pair of longitudinally extending adjustment slots 172 and screw and cord openings provided therein which are normally closed.

The base plate is detachably mounted on the base of the housing 22 by screws 174 (FIG. 1) extending through the housing rim and the base plate flanges 168. The flanges abut the shoulders 54 and 56 adjacent the marginal portions 50 and 52 of the housing. Four elastomeric feet 176 are mounted on the base plate by screws 178 threaded into the base plate. The feet are spaced inwardly from the front end wall 40 for supporting the vacuum unit with its center of gravity off-center towards the rear end wall 42. The unit is resiliently supported in spaced relation above a support on which it is placed.

The motor and fan assembly 32 is mounted on the base plate 30 by means of a slightly flexible angular bracket 182. The assembly includes a variable speed electric motor 184 and a centrifugal fan 186 secured together in a unit for directing the air stream through the motor. An electrical cord 187 (FIG. 5) is connected to the motor and extends through an opening in the base plate for connection to a source of power.

The bracket 182 is secured to the fan housing with an interposed circular resilient gasket 188 by means of screws 190 seated on elastomeric washers 191. The base of the bracket is secured to the base plate 30 by means of screws 192 (FIG. 5) extending through the adjustment slots 172 in the base plate. The base of the bracket covers the slots.

The motor and fan assembly 32 is mounted between the vacuum chamber 24 and the rear end wall 42 of the housing, with the fan 186 contacting the vacuum chamber gasket 108 and a central circular fan intake opening 194 in communication with the air space 110 enclosed by the gasket. The assembly is spaced from the top wall 48 and the side walls 44 and 46 of the housing, and to a lesser extent, from the rear end wall 42 of the housing and from the base plate 30. The discharge openings 170 in the base plate are disposed beneath the vacuum chamber 24 and the fan 186, and the portion of the base plate beneath the motor 184 is substantially imperforate.

The inner surface of the walls of the housing 22 and the base plate 30 are lined with sound-absorbing material. Thus, as illustrated in FIGS. 6 and 7, the rear end wall 42, the side walls 44 and 46, and the top wall 48 are lined with sheets 195–197 of acoustical foam or felt material. The imperforate rear portion of the base plate 30 beneath the motor 184 is lined with a sheet 198 of like material. The perforated portion of the base plate, beneath the vacuum chamber and the fan, is lined with a sheet 199 of sound-absorbing and filter material, such as felted glass fibers. This sheet covers the discharge openings 170, and may be removed and replaced when necessary.

The main switch 68 is connected in circuit, not shown, with the on-off switch 80 and the motor 184. The positions of the main switch are off, normal speed, and high speed. The on-off switch stops the motor when a hair clipper is placed in the instrument well 74 and engages the switch arms 78. The switch arm is released for restarting the motor when the clipper is removed from the well. The receptacle 70 is connected in circuit with the power source and receives a plug on the end of an electrical cord leading to a hair clipper. The cord may be carried by the vacuum hose 38.

In use, the vacuum unit 20 is placed on a back bar or table in a barbershop, or on any convenient support in a shop, home, hospital or institution. With the feet 176 mounted towards the rear of the unit, the support may be relatively narrow and the front end may project therefrom. The base plate 30 is elevated above the supporting surface by the feet a distance, e.g., about one-half inch, sufficient to permit substantially unrestricted air flow from the bottom of the base plate 30.

The vacuum hose coupling 116 is inserted within the mounting ring 112, for direct communication with the interior of the vacuum chamber 24. The plug on the clipper cord is inserted in the receptacle 70. The main switch 68 is set at normal or high speed operation of the motor and fan.

A strong vacuum is exerted at the blades of the clipper, which lifts the hair for rapid, neat cutting and then removes the clippings through the hose 38. The clippings do not fall on the customer or the surrounding areas, which remain clean, neat and sanitary.

Air containing the clippings is drawn from the vacuum hose through the refuse bag 34, which retains the clippings. Any fine material is held by the filter pad 36. Owing to the described construction, the air flow through the bag compartment 60 is such as to deposit the clippings in relatively even layers at the inner end of the bag. Thus, the air space 106 between the bag compartment 60 and the vacuum compartment 92 serves to distribute the air flow through the several bag compartment perforations 88. Air flows from the air space through the vacuum compartment perforations 104, into the air space 110 enclosed by the vacuum chamber gasket 108, through the fan intake opening 194, and through the motor 184, cooling the motor. The filter pad 36 supports the bag 34 away from the bag compartment perforations 88 so that there is no tendency for portions of the bag to be pulled through the perforations.

The arrangement of the components of the unit provides direct, in-line flow from the vacuum chamber 24 to the fan 186, thereby minimizing resistance to air flow and producing maximum vacuum. Consequently, the motor 184 may be operated at a slower speed, thereby reducing noise, increasing motor life, and reducing power requirements. The arrangement of components is also very compact, providing a relatively large bag capacity in a small unit.

With the motor and fan assembly in operation, so that the vacuum chamber 24 is evacuated or under reduced pressure therein, the atmospheric pressure on the outside of the door 28 forces the door against the housing 22, and the door liner 124 forms a tight seal between the housing and the door. The vacuum or reduced pressure produced by the fan also causes the motor and fan assembly 32 to be urged tightly against the vacuum chamber gasket 108, producing a tight seal between the chamber and the fan. The bracket 182 flexes sufficiently to accommodate this sealing movement.

Exhaust air flows from the rear of the motor 184 and follows circuitous or tortuous paths along the side walls 44 and 46 and the top wall 48 over and on the sides of the fan 186 and the vacuum compartment 92, to the discharge openings 170 in the base plate. The muffler-filter sheet 199 thereover collects carbon dust from the motor brushes and any other solid material, so that the air exhausted through the discharge openings is clean. The openings provide a large discharge area, so that the air exists at relatively low velocity and hence quietly and without substantial force.

The remaining structure cooperates to provide an exceptionally quiet running unit. Thus, the gasket 188 and the washers 191 mounting the motor and fan assembly, and the vacuum chamber gasket 108 prevent metal to metal contact which would produce noise. The door liner 124 and the sound-absorbing sheets 195–199 deaden the sound. The relatively long circuitous flow paths of the exhaust air provide a muffler effect.

The flexibility of the mounting bracket 182 for the motor and fan assembly and the resiliency of the assembly and vacuum chamber gaskets 188 and 108 accommodate vibration of the assembly. The resilient feet 176 further serve to dampen vibrations, and they prevent the unit from creeping on the supporting surface.

The clipper may be set in the well 74 at any time, whereupon the clipper engages the switch arm 78 to stop the motor. The main switch 68 may be moved to its off position when it is desired to dip the clipper in sanitizing solution with the vacuum off or when the clipper is not being used.

When it is desired to obtain access to the refuse bag 34, it is merely necessary to raise the latch lever 146 and pull the door open. The vacuum hose 38 and coupling sleeve 116 thereon need not be disconnected for this purpose.

The invention thus provides a convenient, lightweight, compact, and efficient portable vacuum unit which may be used anywhere that hair may be cut to maintain clean and sanitary conditions and prevent the discomfort caused by loose hair clippings. The unit is vacuum tight and produces a relatively high vacuum. The clippers are cooled by the air drawn therethrough, providing greater comfort, and the motor is also air-cooled. The unit operates very quietly and without transmitting vibrations, and clean exhaust air escapes quietly and at low velocity.

While a preferred embodiment of the invention has been illustrated and described, it will be apparent to those skilled in the art that various changes and modifications may be made therein within the spirit and scope of the invention, It is intended that such changes and modifications be included within the scope of the appended claims.

I claim:

1. A portable vaccum unit comprising:
    a housing having a front wall, a rear wall, a top wall and two side walls and a separate base plate serving as a bottom wall, said front wall having a central access opening, said base plate having air discharge perforations of relatively large total are in the front portion, the rear portion being substantially imperforate;
    a door hinged to said housing and when closed overlying said access opening, said door having an aperture and an associated coupling means for a vacuum hose;
    resilient sound absorbing and sealing material on the rear surface of said door adapted to muffle sound and establish an air-sealed relationship between said door and said front wall around said access opening;
    a latch mechanism on said door for releasably holding said door closed over said access opening and permitting said door to move into air-sealed relation with said front wall due to differential air pressures on opposite sides of the door;
    a bag compartment within the forward portion of said housing communicating with said access opening, said bag compartment fixed to said housing and having imperforate top, bottom and side walls spaced from the corresponding housing walls and a perforated inner end wall;
    a filter pad on the inside surface of said inner end wall;
    a filter bag in said bag compartment, the bag bottom adjacent said filter pad and the bag mouth engaging said front wall around said access opening, said bag mouth sealed between said front wall and said absorbing and sealing material of said door when said door is closed;
    a vacuum compartment member within said housing and spaced from and enclosing said bag compartment, the top, bottom and side walls of said vacuum compartment member spaced from the corresponding walls of said housing, the inner end wall of said vacuum compartment member having perforations;
    a resilient gasket on the outside surface of said inner end wall of said vacuum compartment;
    a motor and fan assembly within said housing in axial alignment with said vacuum compartment member, said motor and fan assembly mounted on a resilient bracket secured to said housing base plate, the resilience of said bracket permitting limited axial movement of said assembly, the fan of said assembly engaging said resilient gasket and having an axial air inlet leading from the space within said gasket and an air outlet directed toward the motor of said assembly, said motor and fan assembly spaced from the top, bottom, side and rear end walls of said housing;
    sound absorbing material covering the interior surfaces of said top, side and rear end walls of said housing and the imperforate rear portion of said housing base plate;
    a sheet of sound absorbing and filter material covering the interior surface of the front perforate portion of said housing base plate; and
    feet of resilient frictional material on the exterior of said housing base plate whereby said unit may be supported on a countertop or the like with the plate in sufficiently spaced relation from the countertop to permit the free discharge of air,
    whereby during operation differential air pressure is effective to seal said door against said housing and said fan against said resilient gasket, and air drawn through said unit is distributed uniformly in said bag compartment and space between said bag compartment and said vacuum compartment member, and is directed through and around said motor for cooling purposes, thereafter being diffused in the comparatively large space surrounding said motor and directed in reverse direction along the housing walls and exterior of said fan and said vacuum compartment member to the discharge perforations in the front portion of said housing base plate, said air discharging through these perforations in filtered condition and at comparatively low pressure, insuring silence of operation.

2. The combination of claim 1 wherein said perforations in the inner wall of said bag compartment are in marginal regions, the central region being imperforate, and said perforations in the inner end wall of said vacuum compartment member are misaligned with the bag compartment perforations.

3. The combination of claim 1 wherein said housing except for said base plate is unitary and formed of plastic material.

4. The combination of claim 3 wherein said bag compartment is unitary with the unitary portion of said housing.

5. The combination of claim 1 wherein said door is formed of plastic material, the hinge therefor being an integral section of reduced thickness.

6. A vacuum unit as defined in claim 1 including an instrument well formed integrally with the top wall of said housing, and switch means associated with said well for actuation by an instrument placed therein.

References Cited
UNITED STATES PATENTS

| | | | |
|---|---|---|---|
| 2,439,182 | 4/1948 | Nuffer et al. | 15—327X |
| 2,503,918 | 4/1950 | Osborn et al. | 15—327UX |
| 2,986,765 | 6/1961 | Ernolf et al. | 15—329 |
| 3,334,370 | 8/1967 | Boyd | 15—326X |

ROBERT W. MICHELL, Primary Examiner

U.S. Cl. X.R.

15—326, 327